March 8, 1966  L. I. PICKERT  3,239,247
COUPLING
Filed June 17, 1960
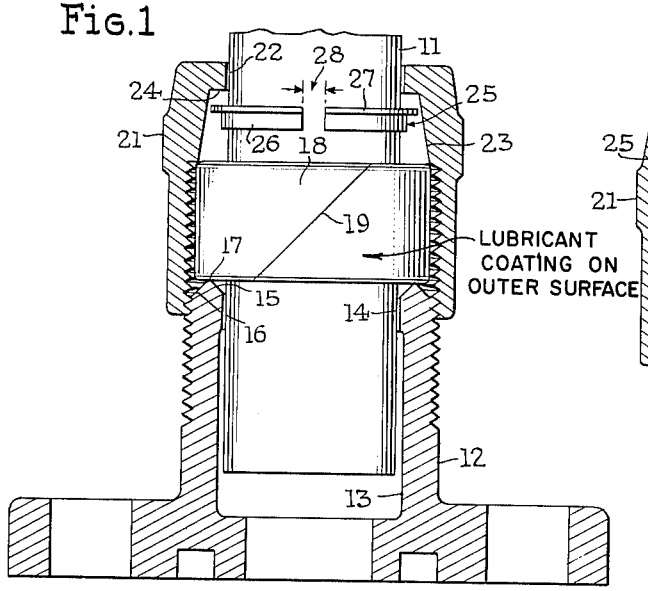
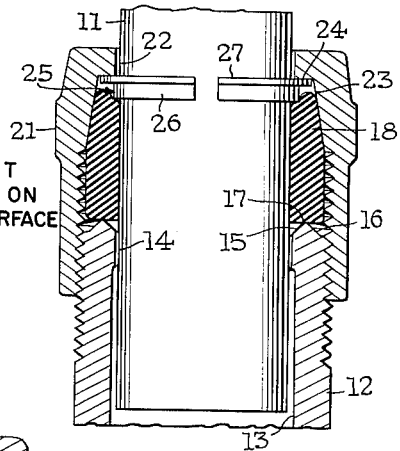
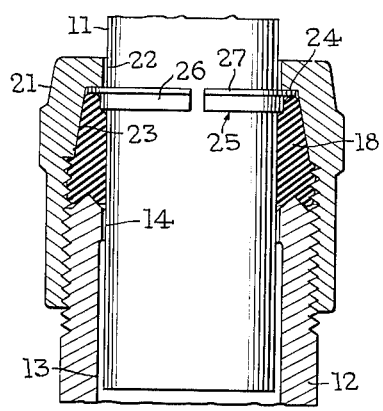
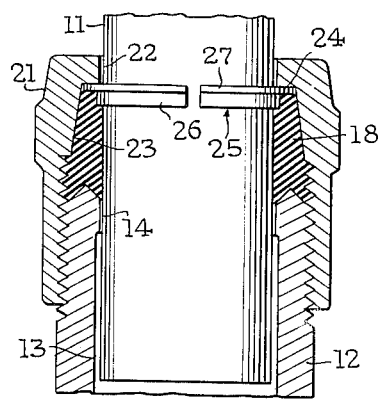
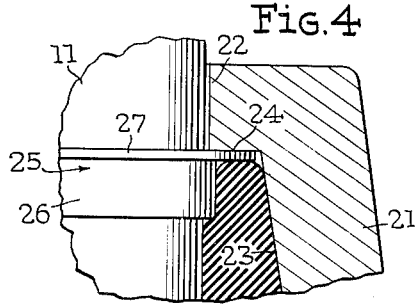
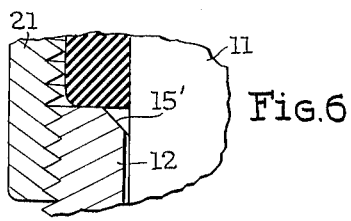
INVENTOR
Lynn I. Pickert
BY *Dodge and Sons*
ATTORNEYS United States Patent Office 3,239,247
Patented Mar. 8, 1966

3,239,247
COUPLING
Lynn I. Pickert, Watertown, N.Y., assignor to The New York Air Brake Company, a corporation of New Jersey
Filed June 17, 1960, Ser. No. 36,960
2 Claims. (Cl. 285—94)

This invention relates to pipe couplings and particularly to pipe couplings used in environments subject to widely varying temperatures.

The object of this invention is to provide a sealed pipe coupling which is air-tight throughout a wide temperature range and yet which is simple and inexpensive to construct and easy to assemble and disassemble.

The preferred embodiment of the invention will be described in detail with reference to the accompanying drawing, in which:

FIG. 1 is an axial sectional view of the coupling showing the parts in the positions they assume prior to tightening of the compression nut.

FIGS. 2 and 3 are views similar to FIG. 1 showing the compression ring in section and illustrating two intermediate stages of assembly.

FIG. 4 is an enlarged view of a portion of FIG. 3 showing the manner in which the rubber compression ring flows around the anti-extrusion ring.

FIG. 5 is another view similar to FIG. 1 showing the final stage of assembly.

FIG. 6 is an enlarged fragmentary view of a portion of the flanged body showing an alternate seat; the parts being shown in the positions they assume prior to tightening of the compression nut.

As shown in the drawing, the invention is embodied in a coupling between a pipe 11 and a flanged body 12. Couplings of this type are frequently used in air brake systems for trains, and this is one environment in which the invention finds particular utility. The pipe 11 conforms to the ASTM pipe specifications for wrought iron and steel pipe. Therefore, for pipes of 1½ inch diameter, or less, the outside diameter can vary between a maximum size of 1/64 inch greater than nominal and a minimum size of 1/32 inch less than nominal.

The flanged body 12 is formed with an axial bore 13 having a minimum diameter portion 14 which is large enough to receive those pipes 11 having the maximum permissible outside diameter. The upper end face of body 12 is beveled at 15 and 16 to form a narrow edge 17. When the parts are assembled, the surfaces 15 and 16 and the edge 17 serve as a seat for a compression ring 18 of resilient material which surrounds pipe 11. The material used in ring 18 must have low compression set characteristics over a wide temperature range. An example of a satisfactory material is a rubber manufactured by Westinghouse Air Brake Company under its material specification M-7062. Ring 18 is split along helical line 19 so that it may be replaced without removing pipe 11 from the bore 13 in body 12. The outer peripheral surface of compression ring 18 carries a thin adherent layer of tetrafluoroethylene resin, marketed by Du Pont under the trademarke "Teflon". The coating is formed by air drying an aqueous dispersion of "Teflon" which is sprayed onto the ring 18. The thickness of the coating is not critical as long as the entire outer surface of the ring 18 is covered. Coatings 0.001 inch thick have proved to be satisfactory. The coating acts as a lubricant or anti-friction material and any other lubricant which is compatible with the material in ring 18 and which will remain in place throughout the temperature range which the coupling encounters is acceptable. Molybdenum disulphide and colloidal graphite are examples of other suitable substances.

Surrounding the compression ring 18 is a compression nut 21 carrying threads which are arranged to mate with those formed on the outer periphery of the flanged body 12. The nut 21, like the flanged body 12, is formed with an axial bore 22 whose diameter is slightly larger than the maximum permissible outside diameter of pipe 11. On its inner periphery, the nut 21 carries a truncated conical surface 23 which intersects the shoulder 24 formed at the upper end of the nut. The shoulder 24 lies in a plane which is normal to the longitudinal axis of the nut 21.

A split anti-extrusion ring 25 partially surrounds pipe 11 and is positioned between shoulder 24 and the compression ring 18. This ring 25, which can be made of brass or steel, is of L-shape in cross-section, one leg 26 lying along the outer surface of pipe 11, and the other leg 27 being arranged to abut shoulder 24. The gap 28 formed in the ring is so dimensioned that when the ring is applied to a pipe 11 having the minimum permissible outside diameter, it is almost but not completely closed. Since the leg 27 of split ring 25 overlies the shoulder 24, it will close the annular space between pipe 11 and bore 22 even when the outside diameter of the pipe 11 is a minimum and the pipe is tilted the maximum possible amount relatively to the nut.

When pipe 11 is to be joined to the flanged body 12, these parts and the compression ring 18, nut 21 and anti-extrusion ring 25 are positioned in the manner shown in FIG. 1. Initially, conical surface 23 does not contact compression ring 18 and anti-extrusion ring 25 is in contact with neither the compression ring 18 nor the shoulder 24 and can be moved freely along pipe 11.

When nut 21 is screwed down a few turns to the position shown in FIG. 2, conical surface 23 engages the compression ring 18 and forces it radially inward toward pipe 11 thus causing a clamping force to be exerted on the pipe. Because of the angle of taper of surface 23, the major portion of the force exerted on the ring 18 by the surface at this time acts in the radial direction. However, the force does not have a longitudinal component which urges the ring 18 downward into contact with the seat edge 17 on body 12. In the FIG. 2 position, no sealing force is exerted on anti-extrusion ring 25.

As the nut 21 is advanced to the FIG. 3 position, the resulting increase in compression of ring 18 causes the resilient material to change shape or flow. Since the outer surface of ring 18 carries a "Teflon" coating, the material at the outer periphery or ring 18 encounters less resistance to flow than the material at the inner periphery. Hence, it is the material adjacent the outer periphery which moves into the existing voids. As shown in FIG. 4, the resilient material flows up into the annular space surrounding leg 26 of anti-extrusion ring 25 and thus forces this leg into sealing contact with the pipe 11 and also forces the leg 27 into sealing contact with shoulder 24. This action prevents resilient material from extruding along the surface of pipe 11 and escaping from the confines of nut 21. It is observed that while it may appear that the opening at gap 28, between the outer periphery of pipe 11 and bore 22, offers a path of escape for the resilient material, in fact this is not so because, first, the area of the opening always small, and second, the width of this gap varies in inverse relation to the radial clearance between pipe 11 and bore 22. Therefore, when the gap 28 is a maximum (indicating the use of a pipe 11 having the maximum permissible outside diameter), the radial clearance is a minimum and escape is prevented.

While the voids at the upper side of ring 18 are filled, and inasmuch as escape of resilient sealing material from this end is prevented, movement of nut 21 toward the FIG. 3 position causes gradual flow of the material in ring 18 down along the beveled surfaces 15 and 16 on the end face of flanged body 12. The result is a tight seal against the edge 17. The resilient material tends to extrude downward through the radial clearance between the pipe 11 and bore portion 14 but, since the annular space between pipe 11 and bore 13 is subject to the superatmospheric pressure of the fluid carried by pipe 11, the amount of material which flows along this path is negligible. Of course, if conditions required it, a second anti-extrusion ring could be employed at this point. To date, tests have shown that this additional measure is not required.

When the nut 21 is advanced to the final position, shown in FIG. 5, and maximum torque is applied, all of the voids within the space defined by nut 21, body 12 and pipe 11 are filled by the resilient material in ring 18. Thus, final movement of nut 21 produces large radial forces on the ring 18 in the region of anti-extrusion ring 25 and large longitudinal forces throughout its length.

If the coupling temperature is raised, the material in ring 18 may expand faster than the metal in nut 21 and increase the longitudinal sealing forces tending to aggravate extrusion between pipe 11 and bore portion 14. Displacement of resilient material in the other direction along pipe 11 is prevented by the anti-extrusion ring 25.

If the coupling is cooled, that portion of ring 18 between conical surface 23 and pipe 11 contracts but, since the ring is installed under a large compressive load in the radial direction, radial contraction due to temperature is compensated by an equal expansion due to the resulting reduction in compressive force. Because of this, the seal at the outer periphery of pipe 11 is maintained. The longitudinal compressive load is less than the radial compressive load and contraction of ring 18 will cause the rubber to recede up to the beveled surfaces 15 and 16. However, since there is essentially line contact between seat 17 and the ring 18, that portion of the ring 18 between edge 17 and shoulder 24 is maintained in longitudinal compression and the seal is not broken. It is for these reasons that the resilient material must have low compression set characteristics. Pipes carrying compressed air and coupled in the manner described here, have been tested in the temperature range of −50° to 212° F. and have proved to be leakproof after many cycles of temperature reversal.

Tests also have shown that flanged bodies having the seat configuration shown in FIG. 6 are satisfactory. In this arrangement, only the inner peripheral edge at the upper end of body 12 is beveled (see 15′). The arrangement of FIGS. 1–5 is preferred, however, because it provides more positive sealing action.

The lubricant film coating on the outer surface of compression ring 18 performs two important functions which are worthy of comment. First, it must be realized that the maximum torque that may be applied to the nut 21 may be limited only by the size of the wrench used. In the absence of the lubricant coating, twisting stresses which are built up in ring 18, as a result of high torque, may be large and tend to unscrew the nut 21 when the wrench is removed. When this happens, a substantial portion of the compressive force created in ring 18 is released. With the present coupling, however, the nut can move freely over the outer periphery of ring 18 and no such unscrewing tendencies are encountered. Furthermore, the lubricating action of the "Teflon" coating also makes it possible to remove the nut 21 from the outer periphery of compression ring 18 when replacement is desired. This freedom of removal is present even though the coupling has been in service for an appreciable length of time and has encountered widely varying temperature conditions.

The conical surface 23 and the anti-extrusion ring 25 also perform essential functions. The surface 23 exerts forces which displace the material of ring 18 in several directions and thus ensures the presence of radial compressive forces even during operation under low temperature conditions. This surface also affords gradual build up and release of the torque on nut 21 when the coupling is assembled and dismantled, respectively. The anti-extrusion ring 25 prevents escape of the resilient material in ring 18 (and consequently release of the compressive sealing force) even when the outside diameter of pipe 11 is a minimum and a relatively large radial clearance exists between the pipe and bore 22.

As stated previously, the drawing and description relate only to the preferred embodiment of the invention. Since many changes can be made in the structure of this embodiment without departing from the inventive concept, the following claims should provide the sole measure of the scope of the invention.

What is claimed is:

1. In combination, a cylindrical sleeve having a threaded portion on its outer periphery adjacent one end thereof, the inner peripheral edge of the sleeve at said end being beveled to form an inwardly directed seating surface; a pipe extending into the sleeve from the end having the seating surface, the pipe being slidable within the sleeve; a compression ring of resilient material extending around the pipe and located outside the sleeve adjacent the seating surface, the material in the ring having low compression set characteristics; a compression nut encircling the pipe and the compression ring and carrying a threaded portion at one end of which mates with the threaded portion on the sleeve; a shoulder formed on the inside of the nut at the end opposite the threaded portion; a truncated conical surface formed on the inner periphery of the nut and arranged to engage the compression ring when the nut is threaded onto the cylindrical sleeve and force it radially into contact with the pipe and longitudinally into contact with the seating surface, the compression nut, the pipe, and the compression ring defining an annular space at the end of the compression ring opposite the seating surface when the compression nut is in the position in which the truncated conical surface first contacts the compression ring, the truncated conical surface causing the compression ring to extrude into said space as it is forced in the radial and longitudinal directions during continued advancement of the compression nut; a split anti-extrusion ring encircling the pipe and located within the nut between the shoulder and the compression ring; and a thin, adherent, lubricating coating on the outer periphery of the compression ring.

2. In combination, a cylindrical sleeve having a threaded portion on its outer periphery adjacent one end thereof, the inner and outer peripheral edges of the sleeve at said end being beveled to form a narrow sealing edge on the sleeve; a pipe extending into the sleeve from the end having the sealing edge, the pipe being slidable within the sleeve; a longitudinally split compression ring of resilient material extending around the pipe and located outside the sleeve adjacent the sealing edge, the material in the ring having low compression set characteristics; a compression nut encircling the pipe and the compression ring and formed with a threaded portion at one end which mates with the threaded portion on the sleeve; a radially extending shoulder formed on the inside of the nut at the end opposite the threaded portion; a truncated conical surface formed on the inner periphery of the nut and extending from the outer margin of the shoulder to the threaded portion of the nut, the conical surface being arranged to engage the compression ring when the nut is screwed onto the sleeve and force it radially into contact with the pipe and longitudinally into contact with the sealing edge, the compression nut, the pipe, compression ring and the sleeve defining annular spaces at opposite ends of the compression ring when the compression nut is in the position in which the truncated conical surface first contacts the compression ring, the truncated conical surface causing the compression ring to extrude into said spaces as it is forced in the radial and longitudinal directions during continued advancement of the compression nut; a split anti-extrusion ring of L- shape in cross-section encircling the pipe and having one leg which lies along the outer periphery of the pipe and projects toward the compression ring and another leg which extends radially and is interposed between the shoulder and the compression ring; and a thin, adherent, "Teflon" coating on the outer periphery of the compression ring.

References Cited by the Examiner

UNITED STATES PATENTS

| | | | |
|---|---|---|---|
| 400,644 | 4/1889 | Dresser | 285—343 |
| 1,905,122 | 4/1933 | Baash | 285—354 |
| 2,114,771 | 4/1938 | Turner | 285—354 |
| 2,163,810 | 6/1939 | Raybould | 285—354 |
| 2,562,359 | 7/1951 | Iredell | 285—354 |
| 2,585,453 | 2/1952 | Gallagher | 285—354 |
| 2,597,976 | 5/1952 | Cousins | 277—229 |
| 2,717,025 | 9/1955 | Jelinek. | |
| 2,816,472 | 12/1957 | Boughton | 285—354 |
| 2,837,353 | 6/1958 | Ashbrook | |
| 2,907,590 | 10/1959 | Oswald. | |
| 2,965,308 | 12/1960 | Holdren | 277—115 |
| 2,999,701 | 9/1961 | Blair et al. | 285—354 |

FOREIGN PATENTS 56,971    7/1952    France.

CARL W. TOMLIN, *Primary Examiner.*